US008106754B2

(12) United States Patent
Hashizume

(10) Patent No.: US 8,106,754 B2
(45) Date of Patent: Jan. 31, 2012

(54) IGNITION DEVICE OF INTERNAL COMBUSTION ENGINE

(75) Inventor: Katsushi Hashizume, Gamagori (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 1160 days.

(21) Appl. No.: 11/909,895

(22) PCT Filed: Nov. 24, 2006

(86) PCT No.: PCT/JP2006/324050
§ 371 (c)(1),
(2), (4) Date: Sep. 27, 2007

(87) PCT Pub. No.: WO2007/063977
PCT Pub. Date: Jun. 7, 2007

(65) Prior Publication Data
US 2009/0251301 A1 Oct. 8, 2009

(30) Foreign Application Priority Data
Nov. 30, 2005 (JP) ................................ 2005-345823

(51) Int. Cl.

| | |
|---|---|
| ***F02P 5/00*** | (2006.01) |
| ***G06F 19/00*** | (2011.01) |
| ***G06F 11/30*** | (2006.01) |
| ***G06G 7/70*** | (2006.01) |
| ***G01M 15/00*** | (2006.01) |
| ***G01B 3/00*** | (2006.01) |
| ***G01B 5/00*** | (2006.01) |
| ***G01B 3/44*** | (2006.01) |
| ***G01B 3/52*** | (2006.01) |
| ***G21C 17/00*** | (2006.01) |
| ***B60Q 1/00*** | (2006.01) |

(52) U.S. Cl. ................... 340/439; 340/438; 123/406.14; 123/406.13; 701/114; 73/114.62; 73/114.77; 702/33; 702/34; 702/182; 702/183; 702/185

(58) Field of Classification Search .................. 340/438; 123/406.13, 406.14; 701/114; 73/114.62, 73/114.77; 702/33, 34, 182, 183, 185
See application file for complete search history.

(56) References Cited

U.S. PATENT DOCUMENTS

| | | | | |
|---|---|---|---|---|
| 4,307,061 | A * | 12/1981 | Sarholz | 422/94 |
| 6,653,840 | B2 | 11/2003 | Yorita et al. | |
| 2001/0050071 | A1* | 12/2001 | Takahashi et al. | 123/406.16 |
| 2002/0145429 | A1* | 10/2002 | Yorita et al. | 324/380 |
| 2003/0221666 | A1* | 12/2003 | Surnilla et al. | 123/339.19 |

(Continued)

FOREIGN PATENT DOCUMENTS

JP 10-73018 A 3/1998

(Continued)

*Primary Examiner* — Benjamin C Lee
*Assistant Examiner* — Cal Eustaquio
(74) *Attorney, Agent, or Firm* — Sughrue Mion, PLLC

(57) ABSTRACT

When an insulation resistance value of an ignition plug is smaller than a prescribed value, an engine operation state is switched so as to raise a temperature of the ignition plug, thereby promoting deposit cleaning. Such a measures-against-deposit carrying-out state is counted. When a count value exceeds a certain value, that is, when the measures against deposit have sufficiently been performed but the insulation resistance value of the ignition plug is smaller than the prescribed value, it is determined that conductive deposit has adhered to the ignition plug, and for example, an alarm light is turned on in order to urge a driver to perform maintenance of the ignition plug.

16 Claims, 6 Drawing Sheets

U.S. PATENT DOCUMENTS

| | | | | |
|---|---|---|---|---|
| 2005/0022776 | A1 * | 2/2005 | Montgomery | 123/295 |
| 2006/0011169 | A1 * | 1/2006 | Hagari | 123/406.16 |
| 2006/0201472 | A1 * | 9/2006 | Kerns et al. | 123/198 A |

FOREIGN PATENT DOCUMENTS

| | | | |
|---|---|---|---|
| JP | 11-36971 | A | 2/1999 |
| JP | 2001-115877 | A | 4/2001 |
| JP | 2002-81336 | A | 3/2002 |
| JP | 2002-161841 | A | 6/2002 |
| JP | 2002-202039 | A | 7/2002 |
| RU | 2031239 | C1 | 3/1995 |
| SU | 696567 | A1 | 11/1979 |
| SU | 892010 | A1 | 12/1981 |

* cited by examiner

| | | ENGINE SPEED (rpm) | | | | | | | |
|---|---|---|---|---|---|---|---|---|---|
| | | 800 | 1600 | 2400 | 3200 | .... | .... | .... | .... |
| LOAD FACTOR (%) | 10 | 180 | 220 | 280 | 330 | .... | .... | .... | .... |
| | 20 | 220 | 290 | 325 | .... | .... | .... | .... | .... |
| | 30 | 240 | 330 | 390 | .... | .... | .... | .... | .... |
| | 40 | .... | .... | .... | .... | .... | .... | .... | .... |
| | 50 | .... | .... | .... | .... | .... | .... | .... | .... |
| | ⋮ | .... | .... | .... | .... | .... | .... | .... | .... |
| | ⋮ | .... | .... | .... | .... | .... | .... | .... | .... |

TEMPERATURE OF IGNITION PLUG

IGNITION DEVICE OF INTERNAL COMBUSTION ENGINE

TECHNICAL FIELD

The present invention relates to an ignition device of an internal combustion engine included in a vehicle or the like.

BACKGROUND ART

As to an ignition device of an internal combustion engine (hereinafter also referred to as an engine), an ignition device of a type that an ignition plug is arranged in a head cover of the engine such that an ignitor directly protrudes into a combustion chamber and a high voltage generated in an ignition coil is applied to the ignition plug has been known.

For example, as shown in FIG. 8, the ignition plug used in such an ignition device includes an insulator 12 held by cylindrical mounting hardware 11, a central electrode 13 held within insulator 12 and having a tip end protruding from the end of insulator 12, and a ground electrode 14 opposed to central electrode 13 with a prescribed spark gap Ga being interposed, and its structure is such that spark discharge is generated between central electrode 13 and ground electrode 14 by applying a high voltage across central electrode 13 and ground electrode 14.

Meanwhile, depending on an operation state of the engine, deposit may be formed on the ignition plug. The deposit on the ignition plug refers to such a phenomenon that carbon originating from incomplete combustion or the like in the engine adheres to the insulator of the ignition plug, which causes lowering in an insulation resistance value of the ignition plug. When a degree of such deposit on the ignition plug develops, a leakage current flows between the ground electrode and the central electrode of the ignition plug as a result of application of a high voltage at the time of ignition, a voltage across the electrodes lowers, and spark discharge does not occur, which may lead to misfire.

In order to suppress deposit on the ignition plug, conventionally, (1) devising a shape of the ignition plug (for example, a method of promoting deposit cleaning by shaping the ignition plug such that spark sweeps over the top surface of the insulator), (2) a method of cleaning deposit by generating creeping discharge over the top surface of the insulator by using an auxiliary electrode, (3) a method of cleaning deposit by using multiple discharge, and the like have been performed.

Japanese Patent Laying-Open No. 2002-161841 proposes, as another method of suppressing deposit, a method of eliminating deposit by controlling a motor-generator so as to increase electric load imposed on an internal combustion engine and to increase a temperature in a combustion chamber when the deposit is formed on the ignition plug in the internal combustion engine where the motor-generator is operatively coupled.

As to a method of detecting a degree of deposit on the ignition plug, for example, a method of detecting the degree of deposit, by applying a voltage across electrodes of the ignition plug (across the ground electrode and the central electrode), detecting a current that flows between the electrodes (leakage current) with a current detection device, and estimating lowering in an insulation resistance value based on the detected current value, is available.

The deposit formed on the ignition plug can be suppressed with the cleaning method as described above. In the ignition plug, however, in addition to carbon, a metallic additive in fuel (such as iron or manganese) adheres to the insulator and conductive deposit is formed. As such conductive deposit cannot be self-cleaned, it is necessary to issue a warning or the like to a driver at an early stage in order to avoid failure in running.

Meanwhile, the deposit composed of carbon or the like is also conductive accretion. Accordingly, even if the leakage current is detected by the current detection device above, it is impossible to determine whether the leakage current is caused either by the deposit or by the conductive deposit, or whether it is caused by both of the deposit and the conductive deposit. Therefore, it is difficult to take measures for issuing a warning to the driver, of adhesion of the conductive deposit to the ignition plug, and failure in running due to the conductive deposit is concerned.

DISCLOSURE OF THE INVENTION

The present invention was made in consideration of such circumstances, and an object of the present invention is to provide an ignition device of an internal combustion engine capable of determining adhesion of conductive deposit to an ignition plug.

SUMMARY OF THE INVENTION

In consideration of the fact that deposit on the ignition plug can be self-cleaned, for example, by switching an operation state of an internal combustion engine so as to raise a temperature of the ignition plug, the present invention is characterized in that, such a carrying-out state of measures against deposit is counted, and if the count value exceeds a certain value, namely, if measures against deposit are sufficiently performed but a state that an insulation resistance value of the ignition plug is small is maintained, it is determined that conductive deposit that cannot be self-cleaned has adhered to the insulator of the ignition plug.

SOLVING MEANS

Specifically, the present invention is characterized in that an ignition device of an internal combustion engine having an ignition plug includes: a detection portion detecting an insulation resistance value of the ignition plug; a measures-against-deposit carrying out portion carrying out measures against deposit on the ignition plug; a counting portion counting a carrying-out state of the measures against deposit; and a determination portion determining adhesion of conductive deposit to the ignition plug when a carrying-out count value of the measures against deposit exceeds a prescribed value and the insulation resistance value of the ignition plug is smaller than a prescribed value.

According to this specific feature, when the measures against deposit on the ignition plug are performed and the count value obtained by counting the carrying-out state of the measures against deposit exceeds the prescribed value, it can be determined that the measures against deposit have sufficiently been performed and the deposit on the ignition plug has been overcome. If there is no adhesion of the conductive deposit to the ignition plug in such a situation, as the deposit has been overcome, the insulation resistance value of an ignition plug 1 is large enough to exceed the prescribed value. In contrast, if conductive deposit has adhered to the ignition plug, the insulation resistance value of the ignition plug lowers to attain a value not higher than the prescribed value. Therefore, if the carrying-out count value of the measures against deposit exceeds the prescribed value and the insulation resistance value of the ignition plug is smaller than the prescribed value, it can be determined that conductive deposit has adhered to the ignition plug. When it is determined that the conductive deposit has adhered, the driver is notified of that fact through illumination of an alarm light, whereby measures for urging the driver to perform maintenance of the ignition plug can be taken.

In addition, as to measures to be taken when it is determined that the conductive deposit has adhered to the ignition plug, measures for controlling an operation state of the internal combustion engine so as to lower a temperature of the ignition plug may be available. By taking such measures, lowering in the insulation resistance value due to the conductive deposit is mitigated and misfire is less likely. Therefore, emission of unburned gas toward a catalyst in an exhaust system can be suppressed and damage of the catalyst can be prevented.

Here, in the present invention, as to a method of detecting the insulation resistance value of the ignition plug, a method of providing a current detection portion detecting a current (leakage current) that flows between electrodes of the ignition plug when a voltage is applied across the electrodes (across the central electrode and the ground electrode) and estimating the insulation resistance value of the ignition plug based on a current value detected by the current detection portion may be available.

In addition, in the present invention, as to measures for overcoming deposit on the ignition plug, a method of promoting deposit cleaning by switching an operation condition of the internal combustion engine so as to raise a temperature of the ignition plug may be available. By adopting such measures against the deposit, problems in the cleaning method such as deposit cleaning by devising the shape of the ignition plug, deposit cleaning by using the auxiliary electrode, deposit cleaning by using multiple discharge, and the like can be avoided.

Namely, in order to realize deposit cleaning by devising the shape of the ignition plug, it is necessary to cause spark to sweep over the top surface of the insulator for self-cleaning. Then, a discharge position is automatically located in the vicinity of the top surface of the insulator, which is displaced from the center of the combustion chamber, resulting in lower ignitionability. Meanwhile, with the method of using the auxiliary electrode, increase in cost due to addition of the auxiliary electrode gives rise to a problem. Further, cleaning by using multiple discharge causes increase in power consumption and shorter interval of maintenance of the ignition plug. Here, by adopting a method of promoting deposit cleaning by switching the engine operation state, these problems can be solved at once.

According to the present invention, as adhesion of the conductive deposit to the ignition plug can be determined, such measures as urging the driver to perform maintenance of the ignition plug by turning on the alarm light can be taken.

BEST MODES FOR CARRYING OUT THE INVENTION

An embodiment of the present invention will be described hereinafter with reference to the drawings.

Figure 1:
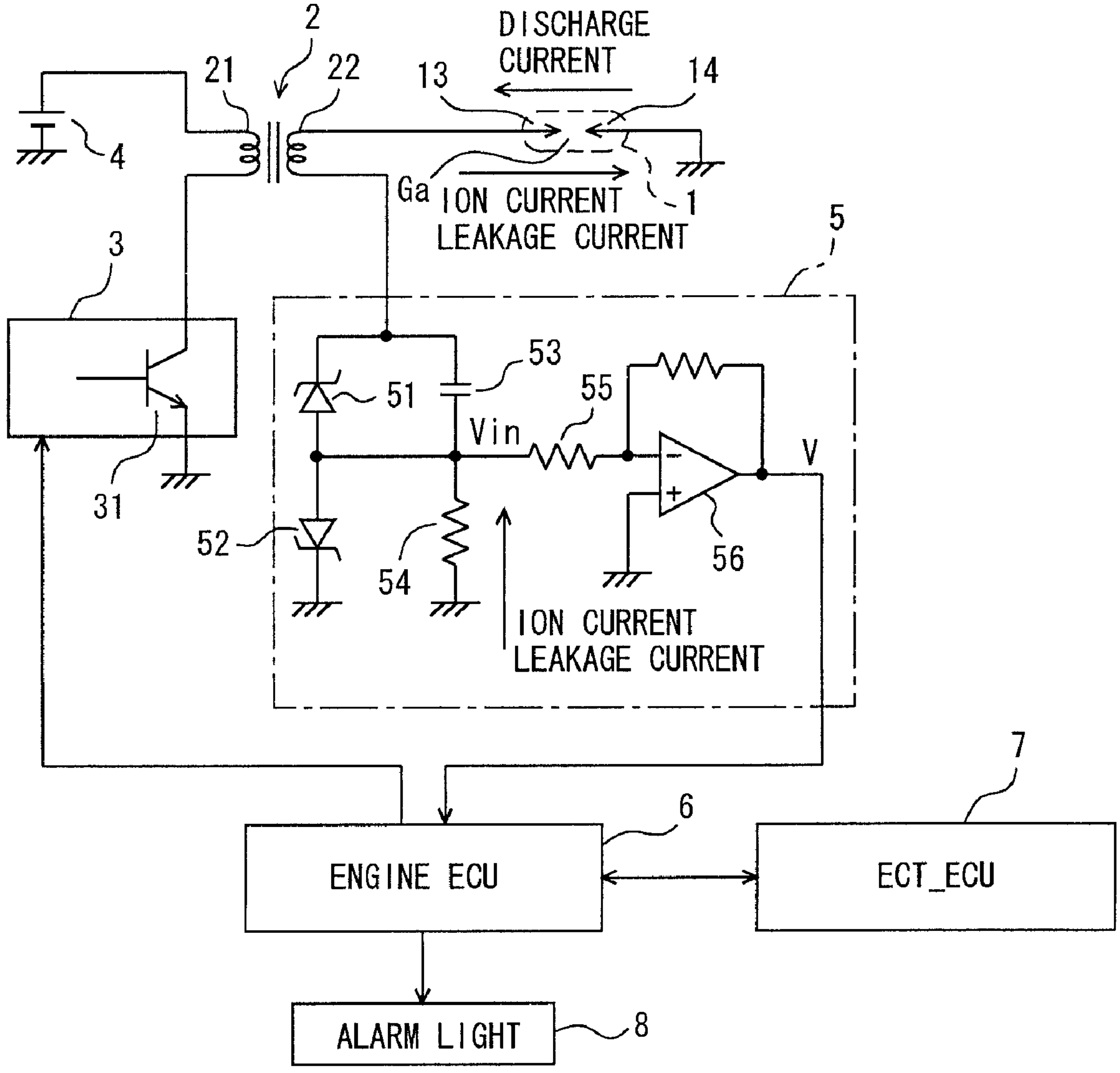
FIG. 1 is a schematic diagram of a configuration of an embodiment of the present invention.

FIG. 1 is a schematic diagram of a configuration of an exemplary ignition device of the present invention.

The ignition device in this example is an ignition device of an engine mounted on a vehicle and coupled to an automatic transmission, and includes an ignition plug 1, an ignition coil 2, an ignitor 3, a battery 4, a current detection circuit 5, an engine ECU (Electronic Control Unit) 6, and the like.

Figure 8:
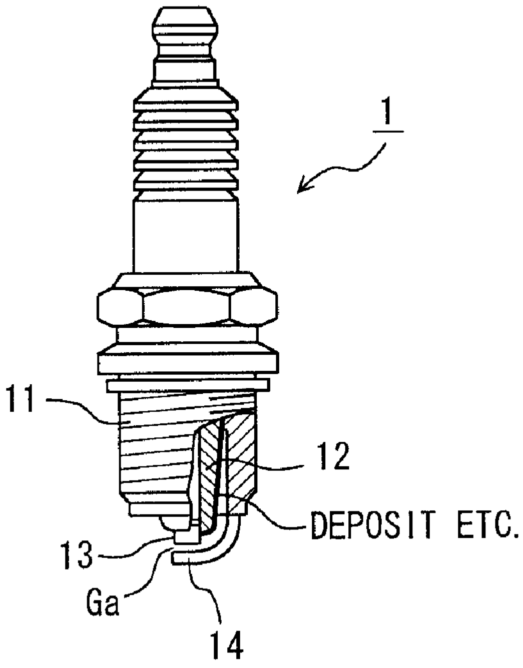
FIG. 8 illustrates an exemplary ignition plug.

As shown in FIG. 8, ignition plug 1 includes insulator 12 held by cylindrical mounting hardware 11, central electrode 13 held within insulator 12 and having a tip end protruding from the end of insulator 12, and ground electrode 14 opposed to central electrode 13 with prescribed spark gap Ga being interposed.

Current detection circuit 5 is a circuit detecting an ion current and a leakage current, and includes two Zener diodes 51, 52, a condenser 53, a current detection resistor 54, a resistor 55, an inverting amplifier circuit 56, and the like.

Ignition coil 2 is constituted of a primary coil 21 and a secondary coil 22. Primary coil 21 has one end connected to battery 4 and the other end connected to a collector of a power transistor 31 contained in ignitor 3. Secondary coil 22 has one end connected to ignition plug 1 and the other end connected to ground through two Zener diodes 51, 52.

Two Zener diodes 51, 52 are connected in series in opposite directions. Condenser 53 is connected in parallel to one Zener diode 51, while current detection resistor 54 is connected in parallel to the other Zener diode 52. A potential Vin between condenser 53 and current detection resistor 54 is input to an inversion input terminal (−) of inverting amplifier circuit 56 through resistor 55, where it is inverted and amplified, and an output voltage V of inverting amplifier circuit 56 is input to engine ECU 6 as a current detection signal.

In the ignition device above, during operation of the engine, power transistor 31 turns on/off at rise/fall of an ignition instruction signal transmitted from engine ECU 6 to ignitor 3. When power transistor 31 turns on, a primary current flows from battery 4 to primary coil 21 of ignition coil 2. Thereafter, when power transistor 31 turns off, the primary current in primary coil 21 is cut off and a high voltage is electromagnetically induced to secondary coil 22.

The high voltage causes discharge spark between central electrode 13 and ground electrode 14 of ignition plug 1 and flame is generated, whereby combustion ions are present in the vicinity of spark gap Ga. Here, as spark gap Ga of ignition plug 1 is rendered conductive, the discharge current flows from ground electrode 14 of ignition plug 1 to central electrode 13, flows through secondary coil 22 of ignition coil 2 and charges condenser 53 of current detection circuit 5, and the discharge current further flows toward the ground through Zener diodes 51, 52. After condenser 53 is charged, current detection circuit 5 is driven, with the charge voltage of condenser 53 restricted by a Zener voltage of Zener diode 51 serving as a power supply, so that the ion current (leakage current) is detected.

The ion current (leakage current) flows in a direction opposite to the discharge current. Specifically, after ignition ends, a voltage is applied across central electrode 13 and ground electrode 14 of ignition plug 1 by using the charge voltage of condenser 53. Accordingly, the ion current flows between central electrode 13 and ground electrode 14 as a result of combustion ions generated when an air-fuel mixture burns in the cylinder of the engine. Here, the ion current flows from central electrode 13 to ground electrode 14 and further flows from the ground side through current detection resistor 54 to condenser 53. Here, input potential Vin of inverting amplifier circuit 56 varies in accordance with variation in the ion current that flows through current detection resistor 54, and voltage V in accordance with the ion current is output as the current detection signal from an output terminal of inverting amplifier circuit 56 to engine ECU 6. The ion current is detected from output voltage V of inverting amplifier circuit 56.

In the circuit configuration above, as the degree of deposit on ignition plug 1 develops, the insulation resistance value between central electrode 13 and ground electrode 14 lowers, and the leakage current flows from central electrode 13 to ground electrode 14. The leakage current flows also through a path the same as the ion current. Input potential Vin of inverting amplifier circuit 56 varies in accordance with the leakage current that flows through current detection resistor 54, and voltage V in accordance with the leakage current is output as the current detection signal from the output terminal of inverting amplifier circuit 56 to engine ECU 6. It is noted that, when the ion current is generated, the ion current and the leakage current flow in a manner superimposed on each other.

Figure 2:
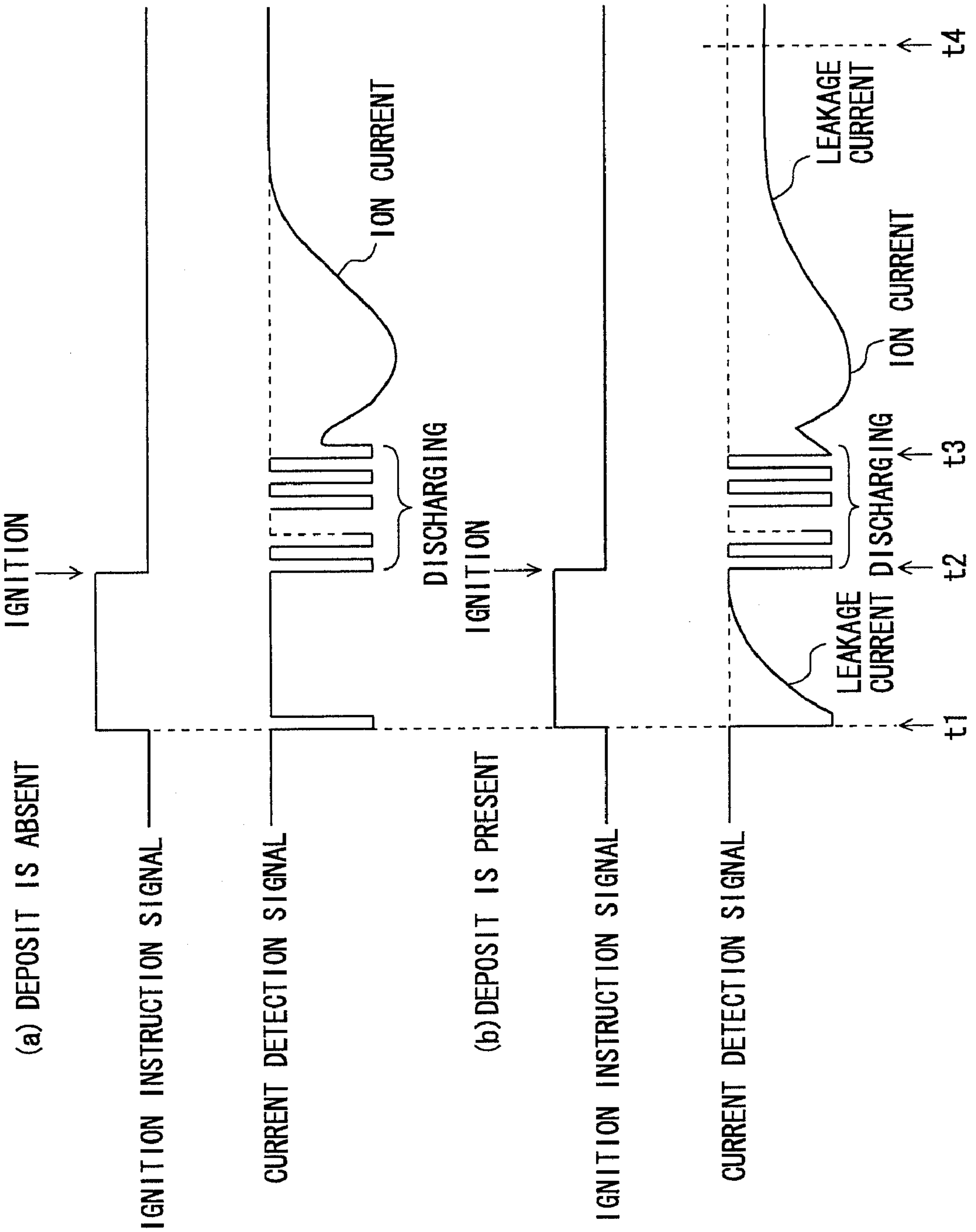
FIG. 2 is a waveform diagram of an ion current (leakage current) that appears in output of a current detection circuit.

The ion current and the leakage current that appear in the output (current detection signal) of current detection circuit 5 will now be described with reference to FIG. 2. FIG. 2(*a*) is a waveform diagram when no deposit is formed on ignition plug 1, while FIG. 2(*b*) is a waveform diagram when deposit is formed on ignition plug 1.

In any of FIGS. 2(*a*) and 2(*b*), the ignition instruction signal rises at time t1 and falls at time t2, so that a high voltage is applied across central electrode 13 and ground electrode 14 of ignition plug 1. Thus, discharge spark is emitted during a time period from time t2 to time t3 to ignite the air-fuel mixture, and the ion current flows after time t3. The ion current increases with the increase in a pressure in the cylinder of the engine, while the ion current decreases and disappears with lowering in the pressure in the cylinder.

Here, it is assumed that deposit is formed on ignition plug 1 (see FIG. 8) and the insulation resistance value between central electrode 13 and ground electrode 14 has lowered. Then, as shown in FIG. 2(*b*), at the time when the primary current starts to flow through ignition coil 2 (at time t1 of rise of the ignition instruction signal), the leakage current flows between central electrode 13 and ground electrode 14 of ignition plug 1 in a direction the same as the ion current, as a result of a voltage electromagnetically induced to secondary coil 22. The leakage current flows immediately after the primary current starts to flow through ignition coil 2, and as the degree of deposit is aggravated, the time period during which the leakage current flows tends to be longer.

After the ignition ends, a voltage is applied across central electrode 13 and ground electrode 14 of ignition plug 1 by using the charge voltage of condenser 53. Accordingly, when the insulation resistance value between central electrode 13 and ground electrode 14 has lowered due to the deposit, as shown in FIG. 2(*b*), the leakage current flows between central electrode 13 and ground electrode 14 in the direction the same as the ion current also after LC resonance (after discharge). Thus, if ignition is performed while the deposit is present, the ion current and the leakage current flow in a manner superimposed on each other after LC resonance. The ion current, however, disappears in a short period of time, and thereafter only the leakage current continues to flow. Therefore, in detecting the leakage current, by detecting the same at time t4 after the ion current disappears, solely the leakage current can be detected with high accuracy without being affected by the ion current.

As described above, when the deposit is formed on ignition plug 1, the leakage current flows at the time when the primary current starts to flow through ignition coil 2 (at t1 of rise of the ignition instruction signal) and after LC resonance (time t4). Therefore, by detecting the leakage current at timing when the ion current is not produced, the insulation resistance value of ignition plug 1 can be estimated (detected) based on the leakage current value. In this example, engine ECU 6 detects the leakage current after LC resonance (time t4) based on the output of current detection circuit 5, to thereby estimate the insulation resistance value.

If the conductive deposit has adhered to the ignition plug in addition to deposit due to carbon adhesion, the insulation resistance value further lowers and the leakage current increases. With detection of the leakage current alone, however, it is impossible to determine whether lowering in the insulation resistance value is caused by the deposit or by the conductive deposit.

Meanwhile, engine ECU 6 includes a CPU, an ROM, an RAM, a backup RAM, and the like. The ROM stores various control programs, maps that are referred to when these various control programs are executed, and the like. The CPU performs operation processing based on the various control programs and maps stored in the ROM. In addition, the RAM serves as a memory temporarily storing a result of operation in the CPU, data input from each sensor, and the like, while the backup RAM is a non-volatile memory storing data and the like to be stored when the engine is stopped.

Engine ECU 6 carries out various types of control of the engine based on detection signals from various sensors arranged in the engine. In addition, engine ECU 6 performs deposit suppression/conductive deposit determination processing as will be described below. It is noted that engine ECU 6 includes a measures-against-deposit carrying-out counter. In addition, an alarm light 8 for urging the driver to perform maintenance of ignition plug 1 is connected to engine ECU 6.

Moreover, in this example, in addition to engine ECU 6, an ECT_ECU (Electronic Controlled automatic Transmission_ Electronic Control Unit) 7 controlling the automatic transmission is provided.

ECT_ECU 7 is configured to communicate a data signal with engine ECU 6. ECT_ECU 7 includes a CPU, an ROM, an RAM, and the like, as in the case of engine ECU 6.

ECT_ECU 29 selects a shift schedule from the ROM based on input values of various sensors and the like from engine ECU 6, data signals indicating operation results and the like, a state of a shift position of the automatic transmission, and the like, and outputs a shift control signal for controlling an actuator of the automatic transmission in accordance with the shift schedule. In addition, when the shift schedule is transmitted from engine ECU 6 while the deposit suppression/conductive deposit determination processing as below is performed, ECT_ECU 7 outputs a shift control signal for controlling the actuator of the automatic transmission based on the shift schedule.

Deposit Suppression/conductive Deposit Determination Processing

Initially, "deposit cleaning promotion" and "plug temperature estimation" performed by engine ECU 6 as well as a "measures-against-deposit effect estimation coefficient" will be described.

[Deposit Cleaning Promotion]

In this example, considering an effect of promotion of deposit cleaning, that is, the effect that cleaning can be achieved as a result of carbon-carbon bond cleavage with the increase in the temperature of insulator 12 of ignition plug 1, an operation condition is switched so as to raise the temperature of insulator 12 (ignition plug 1), to thereby promote deposit cleaning. A specific method for measures against deposit will be described with reference to FIG. 4.

Figure 4:
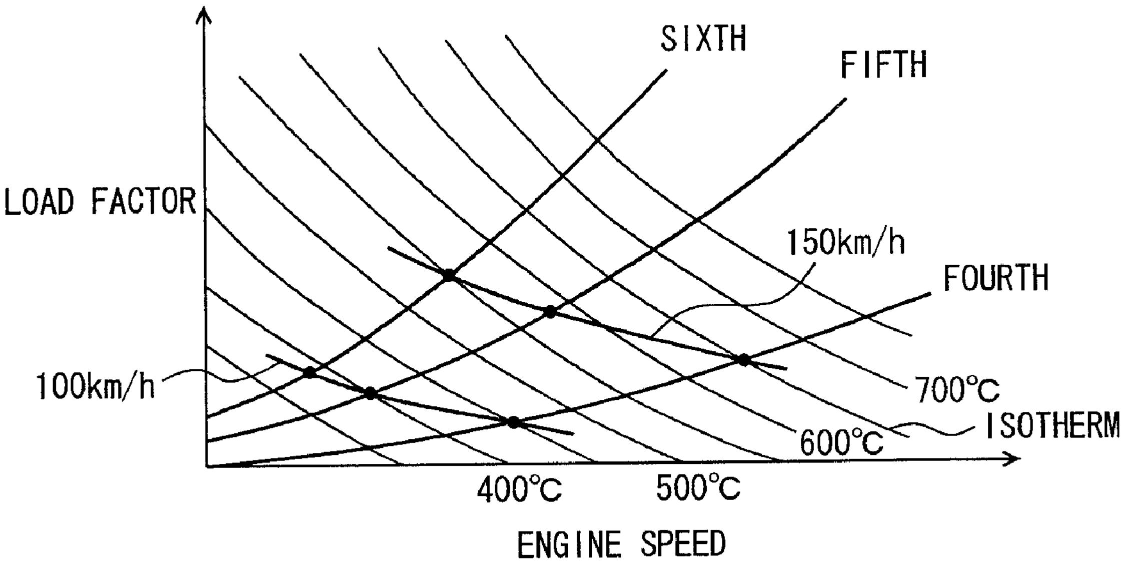
FIG. 4 is an isothermal chart of an ignition plug, with an engine speed and a load factor used as parameters.

FIG. 4 illustrates an isotherm of an ignition plug of a vehicle including an automatic transmission, with an engine speed and a load factor used as parameters. As can clearly be seen from FIG. 4, in a vehicle incorporating an automatic transmission, it is found that, even if the vehicle speed is the same, the temperature of ignition plug 1 is higher when the vehicle runs with a low gear, that is, deposit cleaning tends to be promoted.

In this example, based on the isothermal chart in FIG. 4, a plug temperature increase map (shift schedule map) for raising the temperature of ignition plug 1 is created in advance through experiments, calculation, and the like, and stored in the ROM of engine ECU 6. In order to further raise the temperature of ignition plug 1, such a shift schedule as selecting a lower gear should only be set, however, there is a lower limit of the gear, depending on engine noise, ease in adjustment of the vehicle speed, or the like. Therefore, the plug temperature increase map should be created in consideration of this limit.

In performing deposit cleaning promotion (measures against deposit), engine ECU 6 refers to the plug temperature increase map and selects the shift schedule for raising the temperature of ignition plug 1, and ECT_ECU 7 outputs the shift control signal for controlling the actuator of the automatic transmission based on the shift schedule. The processing is performed in step ST3 in the flowchart shown in FIG. 3.

[Plug Temperature Estimation]

In this example, in order to determine a self-cleaning effect depending on a temperature of ignition plug 1, the temperature of ignition plug 1 is estimated by engine ECU 6. Specifically, based on the isothermal chart in FIG. 4, a plug temperature estimation map (see FIG. 5) using an engine speed and a load factor as parameters is created in advance and stored in the ROM of engine ECU 6. The temperature of ignition plug 1 is estimated by referring to the plug temperature estimation map. The plug temperature estimation processing is performed in step ST5 in the flowchart shown in FIG. 3.

[Measures-against-deposit Effect Estimation Coefficient]

A measures-against-deposit effect estimation coefficient α used in increasing/decreasing a measures-against-deposit carrying-out counter in the conductive deposit determination processing will be described.

Figures 5, 6:
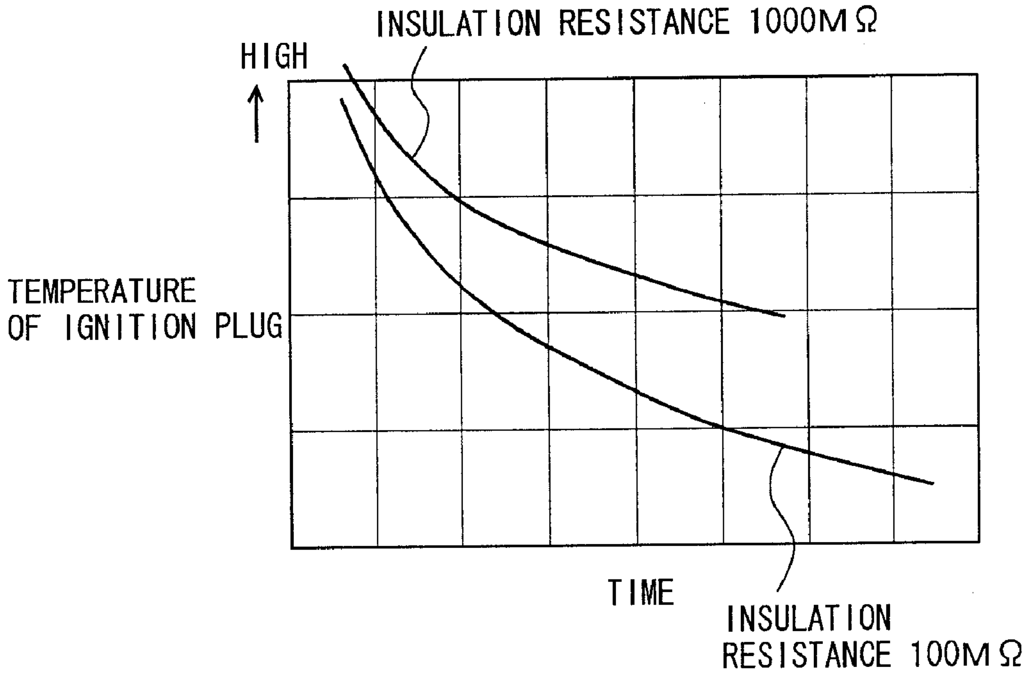
FIG. 5 illustrates a plug temperature estimation map.
FIG. 6 is a graph showing relation between a temperature of the ignition plug and a time required for deposit cleaning.

Initially, the time required for deposit cleaning is dependent on the temperature of the ignition plug. For example, as shown in FIG. 6, as the temperature of ignition plug 1 is higher, the time required for deposit cleaning is shorter. In consideration of such characteristics, in this example, a map having a larger measures-against-deposit effect estimation coefficient α as the cleaning effect per unit time is higher (that is, as the temperature of ignition plug 1 is higher) is created in advance through experiments, calculation, or the like.

Figure 7:
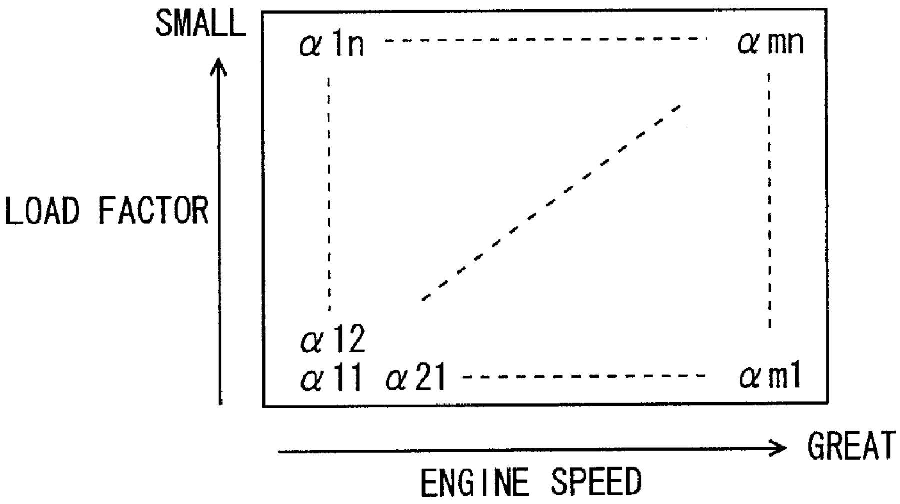
FIG. 7 illustrates a map for finding a measures-against-deposit effect estimation coefficient α.

Specifically, as shown in the plug temperature estimation map (see FIG. 5) above, the temperature of ignition plug 1 can be estimated based on the engine speed and the load factor. Therefore, as shown in FIG. 7, a map determining measures-against-deposit effect estimation coefficient α (for example, integer 1, 2, 3, . . . , n) using the engine speed and the load factor as parameters is created and stored in the ROM of engine ECU 6. Then, in step ST4 in the flowchart shown in FIG. 3, measures-against-deposit effect estimation coefficient α is determined by referring to the map shown in FIG. 7 based on the current engine speed and load factor.

Here, measures-against-deposit effect estimation coefficient α does not necessarily have to be a positive number. In a state where deposit tends to develop, for example immediately after the start in an engine cold state, the value of the measures-against-deposit carrying-out counter should be decreased. Therefore, for example, when a coolant temperature is low, measures-against-deposit effect estimation coefficient α may be determined by using a map having negative measures-against-deposit effect estimation coefficient α.

Figure 3:
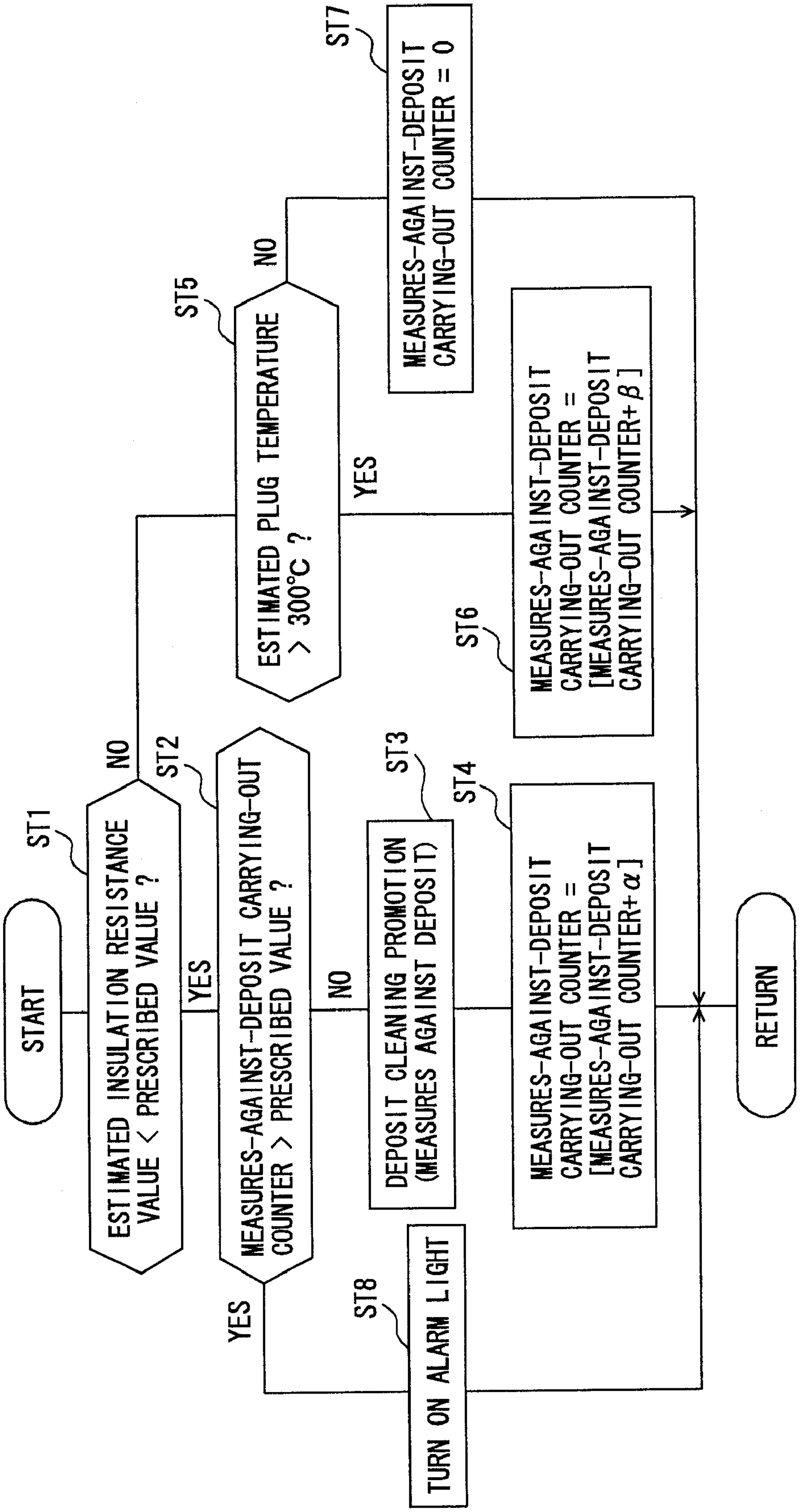
FIG. 3 is a flowchart showing exemplary deposit suppression/conductive deposit determination processing performed by an engine ECU.

The deposit suppression/conductive deposit determination processing performed by engine ECU 6 will now be described with reference to the flowchart shown in FIG. 3. The routine is executed every prescribed time, for example, every several ms. Alternatively, the routine may be executed every prescribed crank angle.

In step ST1, the insulation resistance value of ignition plug 1 is estimated in the processing described above, based on the output of current detection circuit 5 (current detection signal), and whether the estimated insulation resistance value is smaller than a prescribed value is determined. If determination result in step ST1 is Yes, it is determined that deposit or adhesion of the conductive deposit has occurred on ignition plug 1 and the process proceeds to step ST2. On the other hand, if the determination result in step ST1 is No, it is determined that deposit and adhesion of the conductive deposit have not occurred on ignition plug 1 and the process proceeds to step ST5.

It is noted that a value empirically obtained in advance through experiments, calculation, or the like is set as a criterial value (prescribed value) in step ST1, in consideration of the insulation resistance value when deposit or the like adheres to insulator 12 of ignition plug 1.

In step ST2, whether the value of the measures-against-deposit carrying-out counter exceeds a prescribed value or not is determined. If determination result is No, the process proceeds to step ST3, and if determination result is Yes, the process proceeds to step ST8. In step ST2, at the initial stage where measures against deposit have not been performed so far, the value of the measures-against-deposit carrying-out counter is 0.

It is noted that a value empirically obtained in advance through experiments, calculation, or the like, for determining whether the measures against deposit have sufficiently been performed to such an extent that deposit on ignition plug 1 is overcome, is set as a criterial value (prescribed value) in step ST2.

In step ST3, the shift schedule of the automatic transmission is set by referring to the above-described plug temperature increase map based on the current engine speed and load factor, so as to raise the temperature of ignition plug 1, so that deposit cleaning promotion (measures against deposit) is performed. After the measures against deposit in step ST3, the process proceeds to step ST4. Measures-against-deposit effect estimation coefficient α is determined by referring to the map shown in FIG. 7 based on the engine speed and the load factor after the measures against deposit, and the measures-against-deposit carrying-out counter is updated (measures-against-deposit carrying-out counter+α). Thereafter, the routine once ends.

Then, if the determination result in step ST1 is No, in step ST5, the plug temperature estimation map shown in FIG. 5 based on the engine speed and the load factor is referred to, so as to estimate the temperature of ignition plug 1, and whether the estimated plug temperature exceeds 300° C. or not is determined. If determination result in step ST5 is No, the temperature of ignition plug 1 is determined as the temperature at which deposit is not self-cleaned, and the measures-against-deposit carrying-out counter is cleared (measures-against-deposit carrying-out counter=0) in step ST7. On the other hand, if the determination result in step ST5 is Yes, the temperature of ignition plug 1 is determined as the temperature at which deposit is self-cleaned and the process proceeds to step ST6. Though a condition for determination in step ST5, that is, the temperature serving as a reference for determining whether deposit is self-cleaned or not, is set to 300° C., the temperature is not limited thereto. For example, any value in a range from 300 to 550° C. may be employed as the criterial value, depending on engine performance or the like.

In step ST6, a cleaning effect estimation coefficient β is determined based on the estimated temperature of ignition plug 1, and the measures-against-deposit carrying-out counter is updated (countermeasures carrying-out counter+β). Cleaning effect estimation coefficient β, is set in consideration of the temperature of the ignition plug and the time required for deposit cleaning shown in FIG. 6, such that it is greater as the difference between an estimated temperature of ignition plug 1 and a reference temperature set, for example, to 300° C., is greater, that is, as the estimated temperature of ignition plug 1 is higher. It is noted that, as to cleaning effect estimation coefficient β as well, a value empirically obtained in advance through experiments, calculation, or the like (for example, integer 1, 2, 3, . . . , n) is defined as a map using the temperature of ignition plug 1 as parameter, and the map is stored in the ROM of engine ECU 6.

In the deposit suppression/conductive deposit determination processing above, when the estimated insulation resistance value of ignition plug 1 is small, it is determined that deposit or adhesion of the conductive deposit occurs on ignition plug 1, and measures against deposit are taken in step ST3. In accordance with the measures-against-deposit carrying-out state, the measures-against-deposit carrying-out counter is updated (countermeasures carrying-out counter+α). Meanwhile, even in a case where the estimated insulation resistance value of ignition plug 1 is great and there is no deposit or adhesion of the conductive deposit on ignition plug 1, if the temperature of ignition plug 1 is as high as allowing self-cleaning (for example, 300° or higher), the measures-against-deposit carrying-out counter is updated (countermeasures carrying-out counter+β).

When the value of the measures-against-deposit carrying-out counter exceeds the prescribed value, it is determined that the measures against deposit have sufficiently been performed and deposit on ignition plug 1 has been overcome. Here, if there is no adhesion of the conductive deposit to ignition plug 1, as the deposit has been overcome, the estimated insulation resistance value of ignition plug 1 is large enough to exceed the prescribed value. In contrast, if the conductive deposit has adhered to ignition plug 1, the estimated insulation resistance value of ignition plug 1 lowers and it is not higher than the prescribed value. Therefore, in this example, if the value of the measures-against-deposit carrying-out counter exceeds the prescribed value, that is, if the measures against deposit are sufficiently performed but a state that the estimated insulation resistance value of ignition plug 1 is small is maintained, it is determined that the conductive deposit has adhered.

As described above, according to the deposit suppression/conductive deposit determination processing in this example, whether or not the estimated insulation resistance value of ignition plug 1 is smaller than a prescribed value in a state that the measures against deposit have sufficiently been performed is determined, so that presence/absence of adhesion of the conductive deposit to ignition plug 1 can be determined. When it is determined that the conductive deposit has adhered, alarm light 8 is turned on (step ST8), whereby measures for urging the driver to perform maintenance of ignition plug 1 can be taken.

In addition, deposit cleaning promotion (measures against deposit) by switching an engine operation state to raise the temperature of ignition plug 1 is performed, so that problems in the cleaning method such as deposit cleaning by devising the shape of the ignition plug, deposit cleaning by using the auxiliary electrode, deposit cleaning by using multiple discharge, and the like, for example, such problems as deteriorated ignitionability, increase in cost, increase in power consumption, shorter interval of maintenance of the ignition plug, and the like, can be avoided.

Other Embodiments

In the example above, the measures against deposit are taken by switching the shift schedule of the automatic transmission, however, the embodiment is not limited as such. In a vehicle including a continuously variable transmission (CVT), such measures against deposit as switching a CVT gear ratio to raise the temperature of ignition plug 1 may be taken. Alternatively, instead of such a method of switching the operation state, for example, other measures against deposit, such as deposit cleaning by devising the shape of the ignition plug, deposit cleaning by using the auxiliary electrode, deposit cleaning by using multiple discharge, or the like, may be taken.

In the example above, such measures as urging the driver to perform maintenance of the ignition plug by turning on the alarm light when it is determined that the conductive deposit has adhered are taken, however, other measures may be taken. For example, when it is determined that the conductive deposit has adhered, measures for controlling the engine operation state to lower the temperature of the ignition plug can be taken, in addition to turning on the alarm light. By taking such measures, the following effect can be achieved.

Namely, in an example where the conductive deposit is semiconductor deposit, when the temperature of the ignition plug is lowered, the leakage current decreases and lowering in the insulation resistance value due to the conductive deposit is mitigated, and thus misfire is less likely. Thus, emission of unburned gas toward a catalyst in an exhaust system can be suppressed and damage of the catalyst can be prevented.

It is noted that examples of a method of lowering the temperature of the ignition plug by controlling the engine operation state include changing a shift schedule of the automatic transmission, changing ignition timing, changing an EGR amount, and the like.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. An ignition device of an internal combustion engine having an ignition plug, comprising:

detection means for detecting an insulation resistance value of said ignition plug;

measures-against-deposit carrying out means for carrying out measures against deposit on said ignition plug;

counting means for counting a carrying-out state of said measures against deposit; and determination means for determining adhesion of conductive deposit to said ignition plug when a carrying-out count value of said measures against deposit exceeds a prescribed value and the insulation resistance value of said ignition plug is smaller than a prescribed value.

2. The ignition device of an internal combustion engine according to claim 1, further comprising means for turning on an alarm light when it is determined that the conductive deposit has adhered to said ignition plug.

3. The ignition device of an internal combustion engine according to claim 1, further comprising means for controlling an operation state of said internal combustion engine so as to lower a temperature of said ignition plug when it is determined that the conductive deposit has adhered to said ignition plug.

4. The ignition device of an internal combustion engine according to claim 1, further comprising:

current detection means for detecting a current that flows between electrodes of said ignition plug when a voltage is applied across the electrodes;

means for obtaining the insulation resistance value of said ignition plug based on a current value detected by the current detection means.

5. The ignition device of an internal combustion engine according to claim 1, wherein said measures-against-deposit carrying out means includes means for promoting deposit cleaning by switching an operation condition of said internal combustion engine so as to raise a temperature of said ignition plug.

6. An ignition device of an internal combustion engine having an ignition plug, wherein said ignition device detects an insulation resistance value of said ignition plug, carries out measures against deposit on said ignition plug, counts a carrying-out state of said measures against deposit, and determines adhesion of conductive deposit to said ignition plug when a carrying-out count value of said measures against deposit exceeds a prescribed value and the insulation resistance value of said ignition plug is smaller than a prescribed value.

7. The ignition device of an internal combustion engine according to claim 6, wherein said ignition device turns on an alarm light when it is determined that the conductive deposit has adhered to said ignition plug.

8. The ignition device of an internal combustion engine according to claim 6, wherein said ignition device controls an operation state of said internal combustion engine so as to lower a temperature of said ignition plug when it is determined that the conductive deposit has adhered to said ignition plug.

9. The ignition device of an internal combustion engine according to claim 6, wherein said ignition device detects a current that flows between electrodes of said ignition plug when a voltage is applied across the electrodes, and obtains the insulation resistance value of said ignition plug based on a detected current value.

10. The ignition device of an internal combustion engine according to claim 6, wherein said measures against deposit are carried out by promoting deposit cleaning by switching an operation condition of said internal combustion engine so as to raise a temperature of said ignition plug.

11. The ignition device of an internal combustion engine according to claim 2, wherein said measures-against-deposit carrying out means includes means for promoting deposit cleaning by switching an operation condition of said internal combustion engine so as to raise a temperature of said ignition plug.

12. The ignition device of an internal combustion engine according to claim 3, wherein said measures-against-deposit carrying out means includes means for promoting deposit cleaning by switching an operation condition of said internal combustion engine so as to raise a temperature of said ignition plug.

13. The ignition device of an internal combustion engine according to claim 4, wherein said measures-against-deposit carrying out means includes means for promoting deposit cleaning by switching an operation condition of said internal combustion engine so as to raise a temperature of said ignition plug.

14. The ignition device of an internal combustion engine according to claim 7, wherein said measures against deposit are carried out by promoting deposit cleaning by switching an operation condition of said internal combustion engine so as to raise a temperature of said ignition plug.

15. The ignition device of an internal combustion engine according to claim 8, wherein said measures against deposit are carried out by promoting deposit cleaning by switching an operation condition of said internal combustion engine so as to raise a temperature of said ignition plug.

16. The ignition device of an internal combustion engine according to claim 9, wherein said measures against deposit are carried out by promoting deposit cleaning by switching an operation condition of said internal combustion engine so as to raise a temperature of said ignition plug.

* * * * *